United States Patent
Wilkie et al.

(10) Patent No.: US 8,363,244 B2
(45) Date of Patent: Jan. 29, 2013

(54) UPDATING AUTHENTICATION SERVER LISTS FOR USERS ACCESSING SHARED ACCESS DEVICES

(75) Inventors: Robert B. Wilkie, Rochester, NY (US); Kenneth B. Schleede, Webster, NY (US); Michael W. Barrett, Fairport, NY (US); Parul Patel, Fairport, NY (US); Eric Lambert, Macedon, NY (US); Christian G. Midgley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1273 days.

(21) Appl. No.: 11/691,732

(22) Filed: Mar. 27, 2007

(65) Prior Publication Data

US 2008/0244708 A1    Oct. 2, 2008

(51) Int. Cl.
*G06F 3/12* (2006.01)
(52) U.S. Cl. .............. 358/1.15; 726/2; 726/3; 726/26; 726/27; 713/182; 713/183; 713/184; 709/201; 709/217; 709/225; 709/203; 709/229; 358/1.14
(58) Field of Classification Search ................ 726/3
See application file for complete search history.

(56) References Cited

U.S. PATENT DOCUMENTS

| 5,781,711 A | 7/1998 | Austin et al. |
| 5,948,064 A * | 9/1999 | Bertram et al. ............... 709/225 |
| 2003/0084044 A1 * | 5/2003 | Simpson et al. ................. 707/6 |
| 2004/0061729 A1 * | 4/2004 | Green et al. ....................... 347/5 |
| 2004/0139231 A1 | 7/2004 | Newman et al. |
| 2005/0146755 A1 * | 7/2005 | Shimokawa et al. ......... 358/453 |
| 2005/0246716 A1 | 11/2005 | Smith et al. |
| 2006/0190995 A1 | 8/2006 | Horikiri |
| 2008/0134286 A1 * | 6/2008 | Amdur et al. ..................... 726/1 |

* cited by examiner

*Primary Examiner* — Nathan Flynn
*Assistant Examiner* — Bryan Wright
(74) *Attorney, Agent, or Firm* — Gibb & Riley, LLC

(57) ABSTRACT

A method, service, system, computer program, etc., provides a list of acceptable authentication servers that a user could use to log in when accessing a networked device, such as a networked printer or document processing device. The embodiments include preparing a module, such as a dynamically loadable module (DLM) for use in the networked system accessed by the users. Each of the networked devices is enabled to accept the DLM. The embodiments forward the DLM to the networked devices as a print job along a print job submission path within the network. The networked devices recognize the DLM as a special job. Further, the networked devices use the DLM to install the XML file on each of the networked devices. Thus, the authentication server lists and authentication programs are updated within each of the networked devices using the DLM.

20 Claims, 2 Drawing Sheets

UPDATING AUTHENTICATION SERVER LISTS FOR USERS ACCESSING SHARED ACCESS DEVICES

BACKGROUND

Embodiments herein generally relate to methods, systems, services, computer programs, etc., that provide a list of acceptable authentication servers that a user could use to log in when accessing a networked device, such as a networked print device.

When using devices (such as printers, copiers, and other associated document handling devices) connected together through a local area network (LAN) or a wide area network (WAN) it is useful to restrict access rights of different individuals so as to protect the system and devices connected thereto, as well as to protect the privacy of the individual utilizing the devices connected to the network. For example, as explained in U.S. Patent Publication 2006/0190995 (the complete disclosure of which is incorporated herein by reference) modern networked systems need to authenticate the rights of users who desire to access such systems in order to protect the system and the privacy of the user.

Various methodologies are known to provide such authentication and access restrictions as evidenced by U.S. Patent Publication 2005/0246716 (the complete disclosure of which is incorporated herein by reference) which describes an operating system in which an almost unlimited number of computers and peripheral devices can be interconnected through a network and which can restrict access rights depending upon the authentication of the users of the network.

SUMMARY

The embodiments herein provide methods, a computer program, a service, etc. for providing additional authentication server settings to a device to allow for a large number of authentication servers to be used. With these embodiments, a user can use the additional authentication servers by providing a shortcut (for example, before his/her username in the format of <shortcut>/<username>) to indicate that this user should be authenticated using a specific authentication server. In other words, the shortcut maps to the specific server that the user should be authenticated against. The shortcut can, for example, be a domain name, but is not limited to that value. Further, the following can provide settings to several devices at once by sending an authentication file to the shared access devices in the format of a job that is normally processed by the system.

Thus, embodiments herein provide a list of acceptable authentication servers that a user could use to log in when accessing a networked device, such as a networked printer or document processing device. The embodiments include preparing a module, such as a dynamically loadable module (DLM) for use in the networked system accessed by the users. The networked system comprises a plurality of shared devices connected together through a network.

The DLM includes an authentication server list and an optional authentication program. The authentication server list comprises a list of authentication servers which store access rights of the users. The access rights define which of the networked devices the users have a right to access. The optional authentication program (that can be, but does not need to be included in the DLM) requests each user to specify one of the authentication servers, user identification, and a password when logging in. The authentication program can be an update to a previously existing authentication program.

The DLM can use an extensible markup language (XML) file to store the authentication list and the authentication program.

Each of the networked devices is enabled to accept the DLM. The embodiments forward the DLM to the networked devices in the format of a print job along a print job submission path within the network. The networked devices recognize the DLM as a special job different from a standard print job. Further, the networked devices use the DLM to install the XML file on each of the networked devices. Thus, the authentication server lists and authentication programs are updated within each of the networked devices using the DLM. The authentication program provides for the shortcut and the identification to be separated by a backslash, forward slash, or any other appropriate character or punctuation, when the user is logging in.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
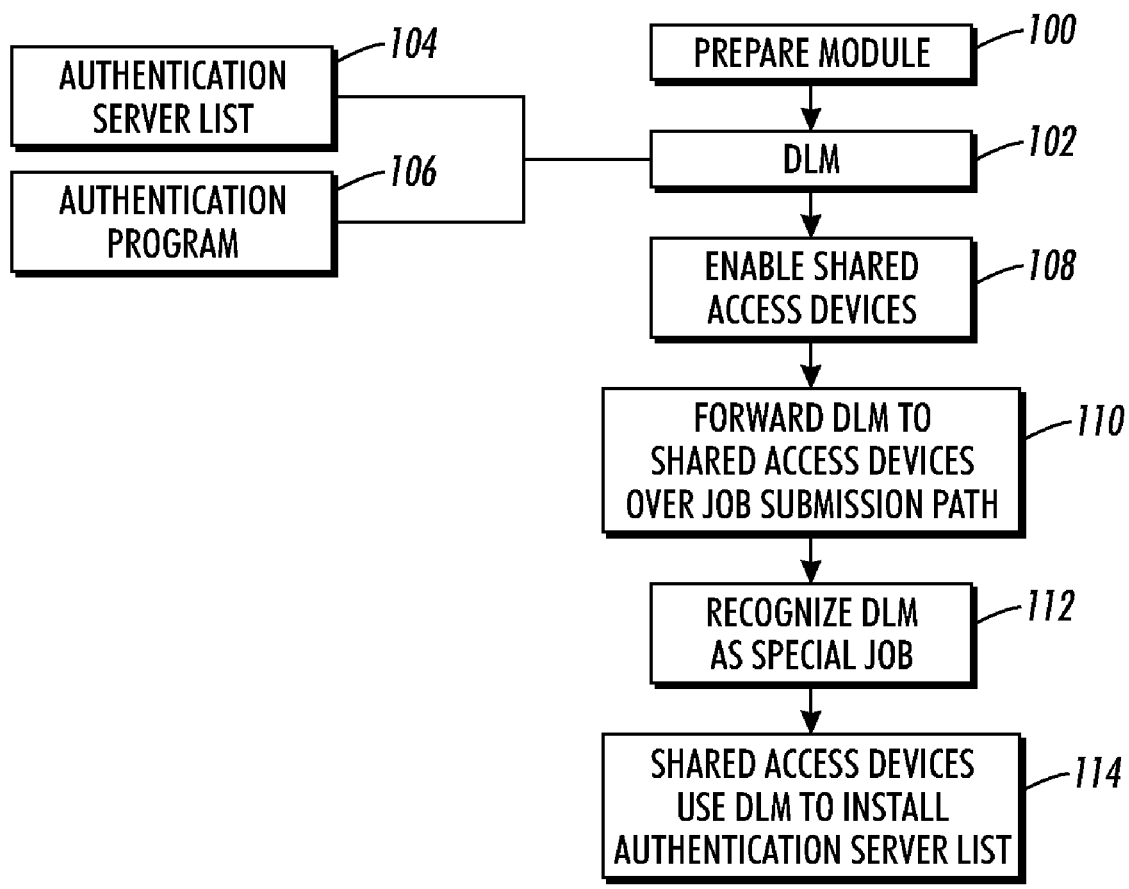
FIG. 1 is a flow diagram illustrating an embodiment herein.

The embodiments herein provide processes, systems, services, computer programs, etc. that provide a list of acceptable authentication servers that a user could contact to log in when accessing a networked device, such as a networked printing device.

As mentioned above, it is useful to restrict the rights of users who desired to access devices connected together through a networked system. For example, one such system can comprise a document handling system and can include a variety of document processing devices including printers, copiers, scanners, document finishers, electronic storage devices, and electronic processing units. Such networked systems are often divided and/or categorized into domains, realms, servers, etc., so that the systems can be more efficiently managed.

Such a document handling system can be used by a variety of different types of users and will need to be serviced by a variety of different types of service engineers. For example, some users may simply want to use the system to print and/or copy documents while other users may desire to perform more sophisticated operations with the system, such as tracking system and employee performance. Similarly, some service engineers may perform relatively routine tasks such as refilling supplies (paper, toner, ink., etc.) while other service engineers may perform more sophisticated operations including internal repairs, upgrades, and reprogramming the various devices connected to the network. Thus, different users/engineers are provided different levels of access.

Different users are provided different rights to the resources connected to the system to protect both the users' privacy and the devices themselves. For example, one group of users can be granted access to one domain or realm that allows them to print and/or copy non-confidential documents using document processing devices that are located in non-secure areas. A different group of users can be granted access to a different domain or realm that allows them to print and/or copy confidential documents using document processing devices that are located in secure areas. As would be understood by one ordinarily skilled in the art, there can be many different levels of security and many different levels of authentication for the different users.

Similarly, the information within the system, the various software programs, as well as highly valued equipment, needs to be protected from unauthorized access. Thus, only those users that need to access sensitive information that is maintained within the network, or who need to access various pieces of equipment, will be provided rights to such domains, realms, servers, etc.

One limitation encountered by authentication systems that check the rights of users accessing the system relates to the number of users that can be granted access to a specific domain, realm, or server and to the number of domains, realms, and servers to which each user can be granted access. Therefore, embodiments herein provide an improved system and methodology for authenticating users to domains, realms, and servers of a networked system.

More specifically, one drawback of conventional systems is that their devices cannot support a large number of authentication servers. However, employees from all over the world may at one point in time need to use such shared systems. These issues are compounded because it is common for such shared devices to be configured for local authentication servers only. These issues could be addressed by optimizing the authentication servers to allow the servers to include as many employees as possible, which is helpful, but not a full solution. Further, guest accounts can be provided for visiting employees to a given site. As a last resort, the authentication on the system could simply be disabled; however, this would forfeit all the security and privacy benefits provided by the authentication system.

Several large organizations need a large number (e.g., 10 or more) authentication servers because of the large number of users they have, and the large number of shared devices they utilize. In other words, many organizations have a large number of domains/realms to authenticate to. The features of embodiments herein extend the capability of many different products by allowing shared access devices to have a long list of valid domain authentication servers (and their addresses) to which a user could authenticate.

Some embodiments described herein use an extensible markup language (XML) file containing a list of many the many domain/realm authentication servers that the user could authenticate to. This XML file ensures that only approved domain/realm authentication servers can be accessed by each of the shared access devices. Further, this XML file can be provided to each of the shared access devices via a job submission path normally used to provide jobs to be process by the shared access devices. For example, this XML file can be provided as a dynamically loadable module (DLM).

In one specific example, when using embodiments herein, the information technology (IT) manager or system administrator (SA) who is setting up user authentication rights makes a list of the user authentication domains/realms/servers that are valid, and to which the user might authenticate. This list might, for example, have tens or hundreds of authentication servers and hundreds or thousands of users. Again, as shown below, this list can be saved as an XML file. This XML file is sent to the shared access devices as a module (DLM) via the normal job submission path (e.g. print job submission path). In other words, the module is sent through line print remote (LPR); an appropriate port; a web page; or another print protocol as a standard print job. The print system identifies this module as a special, non-print job, not just a typical print job. The print system checks to see if the job appears valid and then the module is allowed to make changes to the authentication server list by installing the XML file as the list of authentication server domains. Before the shared access devices are provided the module, each device is enabled to accept such modules. Within the XML file, in some embodiments, one of the authentication servers can be designated as the "default" authentication server domain for a given user. Thus, if the user does not enter an authentication server domain, the default authentication server will perform the authentication of the user.

With embodiments herein, the user login process is altered by the application of the DLM. More specifically, before the module installs the XML file, the system administrator configures the authentication servers using, for example, a network based user interface. At the local user interface, the user is presented with a login screen, in response to which the user selects the appropriate server and enters login name and password. To the contrary, after the module has installed the XML file on the device, when the user is presented with the login screen, the user merely needs to type in a shortcut name for the domain of the authentication server domain and a user name (user identifier). For example, the user can enter the shortcut name of the authentication server and a slash or backslash, followed by the user name (i.e. servername\username) and password. The user will be authenticated by the authentication server that is represented by the shortcut name. Embodiments herein are not limited to back slashes as separators, and any character or punctuation can be used in place of the back slash as a separator.

As shown in FIG. 1, the embodiments herein provide methods, a computer program, a service, etc. for providing a list of acceptable authentication servers that a user could contact to log in when accessing networked devices, such as a networked printing or document processing device. The shared access devices are interconnected together through a network.

In item 100, the process begins by preparing the module (such as the DLM, mentioned above) to create the dynamic loadable module (DLM) 102. The details of DLMs are discussed, for example, in U.S. Pat. No. 5,781,711, (the complete disclosure of which is incorporated herein by reference) and DLMs can comprise any form program that can update the shared access devices. The DLMs used with embodiments herein and created in step 100 include an authentication server list 104 and an optional authentication program 104 that can, as mentioned above, be stored in an XML file format. The authentication server list 104 comprises a list of authentication servers, input in step 100, which store access rights of the users. The access rights stored on the authentication servers define which of the networked devices the users have a right to access. The optional authentication program 106 (that can be, but does not need to be included in the DLM) created in item 100 requests each user to specify one of the authentication servers, user identification, and a password when the user is logging in. The authentication program can be an update to a previously existing authentication program. The DLM uses any common storage methodology, such as the extensible markup language (XML) file, to store the authentication list 104 and the authentication program 106.

Each of the shared access networked devices is enabled to accept the DLM in item 108. The embodiments forward the DLM to the networked devices in the format of a standard job (e.g., print job) along a job submission path (e.g., print job submission path) within the network in item 110. Thus, embodiments herein can simultaneously forward the DLM (or an updated DLM) to all affected devices in a single step. The networked devices recognize the DLM as a special (e.g., non-standard) job and not as a regular job to be processed by the shared access device in item 112. The DLM is delivered as a regular job and confirms to all restraints (size, format, naming conventions, etc.) that the submission path would impose on any other job. Further, the networked devices use the DLM to install the XML file on each of the networked devices in item 114. More specifically, the DLM 102 includes instructions to load the authentication server list 104 and to update the login procedure according to the authentication program 106. Thus, the authentication server lists and authentication programs are updated within each of the networked devices using the DLM in item 114. As mentioned above, the authentication program can provide for the shortcut and the identification to be separated by a backslash when the user is logging in.

Figure 2:
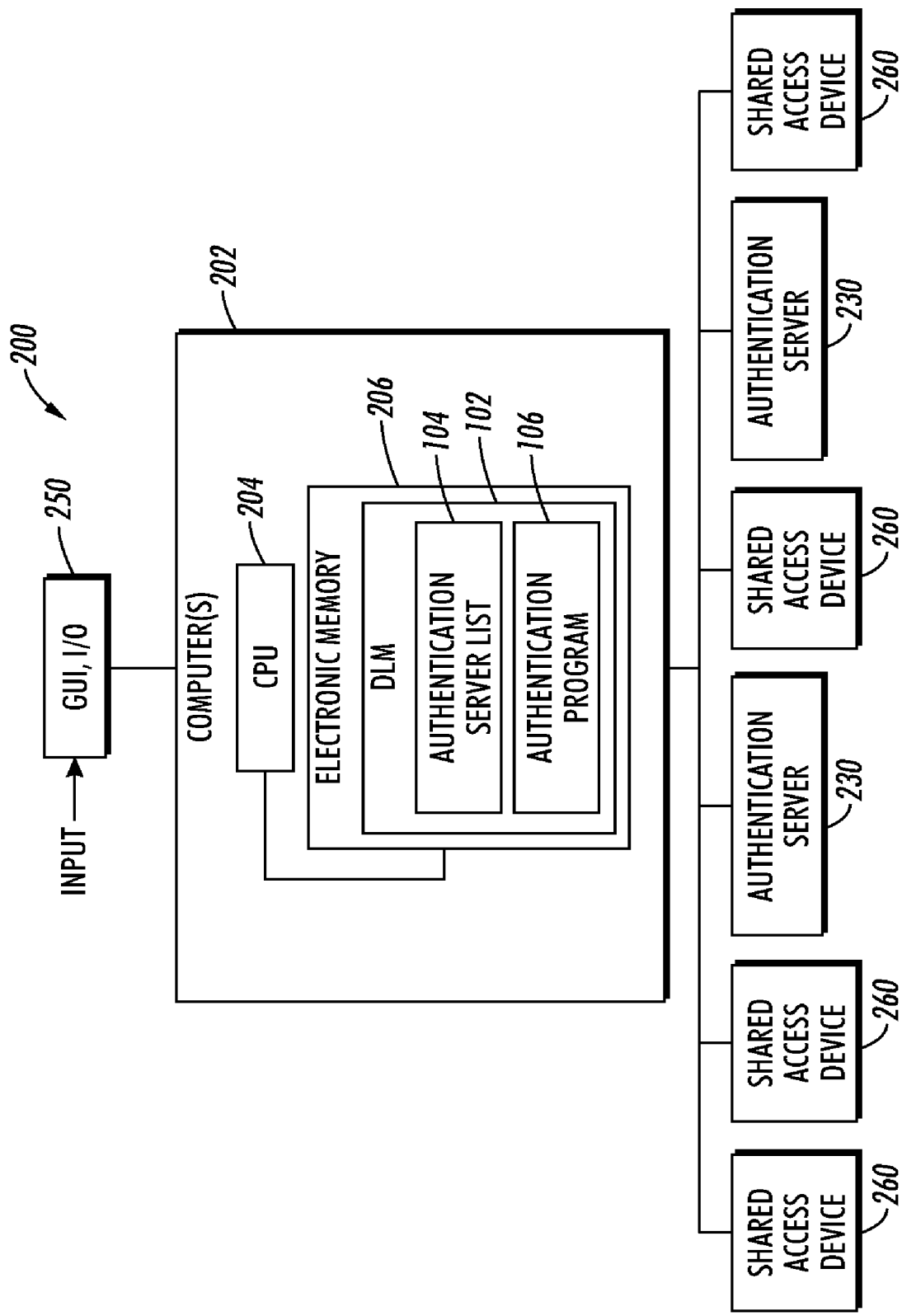
FIG. 2 is a schematic representation of a system according to embodiments herein.

One exemplary system for changing the configurations and/or updating shared devices connected to a network is disclosed in U.S. Patent Publication 2004/0139231, the complete disclosure of which is incorporated herein by reference. Similarly, in one embodiment shown in FIG. 2, a system 200 includes a central processing unit 204 (within a computer 202) and graphic user interface 250 adapted to receive the instructions that relate to the DLM 102, for example. One or more electronic memory elements 206 is provided in the system 200 to store the DLM 102 as well as any other items of interest. As mentioned above, the DLM 102 comprises the authentication server list 104 and the authentication program 106. The computer is connected to shared access devices 260 and authentication servers 230 over a local area network or wide area network.

The authentication servers 230 can comprise dedicated, stand alone computers with storage capability or can comprise a portion of an electronic storage used in a non-dedicated computer. Authentication servers 230 are distinguished from other servers by the nature of the data they store. More specifically, authentication servers 230 store sensitive information that confirms a user's rights to access the shared devices 260, and such information can include passwords, names, access rights of users, etc. Such authentication servers 230 are usually specialized and very secure devices because of the nature of the information they hold.

Computers that include input/output devices, memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein. Similarly, scanners, printers, copiers, and other similar peripheral equipment is available from Xerox Corporation, Stamford, Conn., USA, Visioneer, Inc. Pleasanton, Calif., USA and Hewlett Packard Company, Palo Alto Calif., USA, and the details of such devices are not discussed herein for purposes of brevity and reader focus.

The words printer, printing device, shared access device, etc. as used herein encompasses any apparatus, such as a digital copier, bookmaking machine, facsimile machine, multi-function machine, etc. which performs a print outputting function for any purpose. Such printers commonly include input/outputs, power supplies, processors, media movement devices, marking devices etc., the details of which are omitted herefrom to allow the reader to focus on the salient aspects of the embodiments described herein.

The embodiments herein are very useful for companies that have a large number of authentication servers that are used to grant access to common access machines. Further, the embodiments herein can be used to interface and manage different systems provided by different vendors and manufactures. The embodiments herein allow for settings to be "pushed" to multiple systems at once (verses conventional methods of entering listings of a limited number of authentication servers by hand manually into each device). Further, the embodiments herein provide easy to read configurations file for settings that are software independent. In addition, this disclosed system/method provides for visiting employees to be given a site to have temporary access to the shared devices.

All foregoing embodiments are specifically applicable to electrostatographic and/or xerographic machines and/or processes as well as to software programs stored on the electronic memory 206 and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
preparing a module for use in a networked system accessed by users,
said networked system comprising a plurality of networked printing devices connected together through a network,
said module comprising a form program comprising an authentication server list,
said authentication server list comprising a list of authentication servers which store access rights of said users and instructions related to said authentication server list, and
said access rights defining which of said networked devices said users have a right to access;
formatting said module as a document print job;
forwarding said module, which is formatted as said document print job, essentially simultaneously to each of said networked printing devices along a print job submission path within said network, said formatting being performed such that said document print job conforms to all restraints imposed by said print job submission path on any other document print jobs;
recognizing, by each of said networked printing devices, said module, which is formatted as said document print job, as a special job to be processed differently than said any other document print jobs; and
following said recognizing of said module as said special job, updating, by each of said networked printing devices and according to said instructions, authentication server lists within said networked devices using said module.

2. The method according to claim 1, said module comprising an extensible markup language (XML) file storing said authentication server list.

3. The method according to claim 2, said updating comprising using said module to install said XML file on said each of said networked devices.

4. The method according to claim 1, further comprising enabling said networked devices to accept said module.

5. The method according to claim 1, further comprising providing an authentication program in said module, said authentication program requesting each user to specify one of said authentication servers, a user identification and a password when logging in to said networked system and further allowing said one of said authentication servers and said user identification specified during said logging in to be separated by a character.

6. A method comprising:
preparing a module for use in a networked system accessed by users,
    said networked system comprising a plurality of networked printing devices connected together through a network,
    said module comprising a form program comprising an authentication server list and an authentication program and instructions related to said authentication server list and said authentication program,
    said authentication server list comprising a list of authentication servers which store access rights of said users,
    said access rights defining which of said networked printing devices said users have a right to access, and
    said authentication program requesting each user to specify one of said authentication servers, a user identification, and a password when logging in to said network system;
formatting said module as a document print job;
forwarding said module, which is formatted as said document print job, essentially simultaneously to each of said networked printing devices along a print job submission path within said network, said formatting being performed such that said document print job conforms to all restraints imposed by said print job submission path on any other document print jobs, said restraints comprising at least format, size and naming conventions;
recognizing, by each of said networked printing devices devices, said module, which is formatted as said document print job, as a special job to be processed differently than said any other document print jobs; and
following said recognizing of said module as said special job, updating, by each of said networked printing devices and according to said instructions, authentication server lists and authentication programs within said networked printing devices using said module.

7. The method according to claim 6, said module comprising an extensible markup language (XML) file storing said authentication server list and said authentication program.

8. The method according to claim 7, said updating comprising using said module to install said XML file on each of said networked printing devices.

9. The method according to claim 6, further comprising enabling said networked printing devices to accept said module.

10. The method according to claim 6, said authentication program allowing said one of said authentication servers and said user identification specified during said logging in to be separated by a character.

11. A method comprising:
preparing a dynamically loadable module (DLM) for use in a networked system accessed by users,
    said networked system comprising a plurality of networked printing devices connected together through a network,
    said DLM comprising a form program comprising an authentication server list and an authentication program and instructions related to said authentication server list and said authentication program,
    said authentication server list comprising a list of authentication servers which store access rights of said users,
    said access rights defining which of said networked printing devices said users have a right to access, and
    said authentication program requesting each user to specify one of said authentication servers, a user identification, and a password when logging in to said networked system;
formatting said DLM as a document print job;
forwarding said DLM, which is formatted as said document print job, to said networked printing devices along a print job submission path within said network, said formatting being performed such that said document print job conforms to all restraints imposed by said print job submission path on any other document print jobs, said restraints comprising at least format, size and naming conventions;
recognizing, by each of said networked printing devices, said DLM, which is formatted as said document print job, as a special job to be processed differently than said any other document print jobs; and
following said recognizing of said DLM as said special job, updating, by each of said networked printing devices and according to said instructions, authentication server lists and authentication programs within said networked printing devices using said DLM.

12. The method according to claim 11, said DLM comprising an extensible markup language (XML) file storing said authentication list and said authentication program.

13. The method according to claim 12, said updating comprising using said DLM to install said XML file on each of said networked printing devices.

14. The method according to claim 11, further comprising enabling said networked printing devices to accept said DLM.

15. The method according to claim 11, said authentication program allowing said one of said authentication servers and said user identification specified during said logging in to be separated by a character.

16. A computer program product stored in electronic storage memory of a computer comprising instructions that, when executed by a computer, causes the computer to perform a method comprising:
preparing a module for use in a networked system accessed by users,
    said networked system comprising a plurality of networked devices connected together through a network,
    said module comprising a form program comprising an authentication server list and an authentication program and instructions related to said authentication server list and said authentication program,
    said authentication server list comprising a list of authentication servers which store access rights of said users,
    said access rights defining which of said networked devices said users have a right to access, and
    said authentication program requesting each user to specify one of said authentication servers, a user identification, and a password when logging in to said networked system;
formatting said module as a document print job; and
forwarding said module, which is formatted as said document print job, to said networked devices along a print job submission path within said network, said formatting being performed such that said document print job conforms to all restraints imposed by said print job submission path on any other document print jobs, said restraints comprising at least format, size and naming convention, said module, which is formatted as said document print job, being recognized by said each of said networked devices as special job to be processed differently than said any other document print jobs and then used to update, according to said instructions, authentication server lists and authentication programs within said networked devices.

17. The computer program product according to claim 16, said module comprising an extensible markup language (XML) file storing said authentication list and said authentication program.

18. The computer program product according to claim 17, said updating comprising using said module to install said XML file on each of said networked devices.

19. The computer program product according to claim 16, further comprising enabling said networked devices to accept said module.

20. The computer program product according to claim 16, said authentication program allowing said one of said authentication servers and said user identification specified during said logging in.

* * * * *